3,248,339
PROCESS FOR MANUFACTURING COARSE GRAIN POROUS FORMED BODIES CONTAINING ION EXCHANGERS
Hellmuth Spes, Gerhard Künstle, and Theodor Altenschöpfer, Burghausen, Upper Bavaria, Germany, assignors to Wacker-Chemie G.m.b.H., Munich, Germany, a corporation of Germany
No Drawing. Filed July 26, 1963, Ser. No. 297,963
Claims priority, application Germany, Aug. 6, 1962, W 32,748; Feb. 22, 1963, W 33,960; Apr. 11, 1963, W 34,291
7 Claims. (Cl. 252—426)

This invention relates to the manufacture of coarse grain porous formed bodies containing ion exchangers, and it has for its object to provide a novel and improved process for this purpose.

Another object of the invention is to produce mechanically stable porous formed bodies containing ion exchangers, in which the ion exchanger surfaces are unobstructed and are thus wholly accessible to fluid chemical reactants to which said bodies are exposed in the course of chemical reactions, thereby greatly increasing the catalytic activity as compared with that obtainable with prior art ion exchangers.

Still another object is to produce molded porous bodies in the form of grids of various shapes, for instance ball-shaped, in which the framework of the body consists of a mechanically strong porous reticulum of thermoplastic or resinous material which may also include linked fibrous materials, all inert to the fluid reactants to be employed in the chemical reactions referred to above, within which reticulum are imprisoned the ion exchanger particles whose entire surfaces are accessible to the fluid reactants due to the fact that said surfaces are not stuck to the framework of said body or covered by any coating.

Various other objects and advantages will be apparent as the nature of the invention is more fully disclosed.

Commercially obtainable fine-grained ion exchangers can be used for liquid-phase reactions only on a laboratory scale without complications, for instance when a reaction mixture is passed through an ion exchanger bed. However, if gas or steam develops in the course of the process, for instance with any reaction where the ion exchanger as catalyst is arranged in the form of a column filling and the reaction product is distilled off, complicated measures are required to fix the ion exchanger in the column and to enable the gas to leave the ion exchanger bed.

Attempts have been made to make the ion exchanger itself in the shape of larger, porous bodies. However, these have very little mechanical strength, so that a continuous intensive abrasion is visible.

Another proposal, to paste the ion exchanger on filler bodies, could not be carried out technically because the ion exchanger fell off due to swelling, or it became ineffective due to diminution or loss of its free surface when pasted over.

The same drawback of reducing the free surface results from the process of cementing the exchanger with artificial resin. Here too the access of the reaction partners to the catalyst is greatly impeded because the effective ion exchanger surface is reduced by the cemented places. In order to keep the loss of catalytic efficiency low, the quantity of cement must be as small as possible. However, this decisively reduces the strength characteristics of the molded bodies or briquettes.

Another possibility is to fix the ion exchanger in place by building it into spaces or chambers which permit the entry of liquids and the escape of gases, but prevent the exchanger itself from leaving these chambers. This may for instance be done with nets, cages, sieves or gaps. Such devices are very complicated and expensive and due to their fineness they are extremely prone to corrosions which make the device useless in a short time.

Another proposal is to imbed the ion exchanger in a polyethylene film. Here, too, there is the difficulty of placing the film in the reaction chamber, for example as a column filler or stuffing, and moreover the access of the reaction partners to the exchanger is greatly hampered by the film.

The above difficulties explain why ion exchangers, except for the treatment of pure liquids, have not been generally accepted in technology.

We have now discovered a process for making coarse-grained, porous molded bodies containing ion exchangers, by using framework or grid substances which not only permit the placing of the ion exchanger in mechanically stable molds, which for instance are suitable as column fillers, but also—by keeping the ion exchanger surface free and permitting the unhampered access thereto of the reaction partners—results in an increased catalytic activity as compared with prior art ion exchanger bodies.

Our process is characterized by the fact that the ion exchanger—if necessary by using a filler which can either be taken out or which remains in the mold—is molded and hardened with a binding agent, without clogging the ion exchanger surface, which is achieved.

(a) By sintering with a thermoplastic material, where at least so much thermoplastic material is used that after sintering it forms a continuous framework or reticulum, and the heating is interrupted before the thermoplastic material gets clogged with the ion exchanger by melting, or (b) By mixing the ion exchanger with a fibrous material, wetting the mixture with a liquid in which the binding agent is not soluble, mixing with the binding agent, and removing the added liquid from the mold.

Our process makes it possible to obtain porous molds which contain the ion exchanger, but in which the latter is not clogged or pasted over. The proportion between the parts, namely the ion exchanger and the framework substances can vary within a wide range and can be easily determined by preliminary experiments. It is important that the quantity of the framework substance should be sufficiently large, as its elasticity compensates for the swelling processes of the ion exchanger and assures perfect transfer of the reaction medium from and to the ion exchanger. In the case of lighter and more voluminous framework substances comparatively large quantities of ion exchangers can be placed without having swelling effects destroy the body. For instance, weight proportions between 10:1 and 1:10 between framework substances and ion exchangers have been found to be workable. In special cases other proportions can also be used.

Useful as framework substances are for instance thermoplastic materials, in suitable cases with the use of filler materials.

The proportion of the plastic material to the ion exchanger, and in suitable cases the filler material, may vary within a great range and depends on the grain size of the plastic material and ion exchanger used. In order to prevent the ion exchanger from falling out from the mold, the grain size of the thermoplastic material is kept smaller than that of the ion exchanger. The smaller the grain size of the plastic material, the less plastic material is necessary to obtain a continuous framework of plastic after sintering. Very good results are obtained with powdered plastic material.

The mechanical stability of the molded body is a function of the percentage of the ion exchanger in the mold and the grain size of the thermoplastic material. Molded bodies with high mechanical stability are obtained, for instance, with a mixture proportion of 1 weight unit of thermoplastic material to 1 weight unit of ion exchanger, or perhaps to 1 weight unit of filler material. However, one can also use 2 or 3 weight parts of ion exchanger, if the plastic material is sufficiently fine, without resulting in any significant change in the stability of the mold. Since the ion exchangers in the molds made in accordance with the process of the invention are very active, a smaller quantity of ion exchanger is sufficient in most cases. The most suitable proportion for the intended use and the most suitable grain size can easily be determined by preliminary tests.

Suitable as framework substances are thermoplastic materials which are stable toward the reaction medium used and which are not, or only slightly, linked. Polyethylene and polypropylene are suitable in most cases. In many cases, however, one can just as well use for instance polyvinyl chloride, polystyrol, polyamide, polyacrylic acid ester, polymethacrylic acid ester, cellulose derivatives as pure polymerizates or condensation products, or as copolymerizates.

The sintering temperature and sintering duration are dependent on each other and they can be varied within a limited range characteristic of the plastic material used. A higher sintering temperature requires a shorter sintering period and vice versa. It is essential that the thermoplastic material be heated only within the range of the softening point and that it does not melt, the ion exchanger grains should not be cemented, so that their surface is not reduced. The correctness of the sintering temperature and sintering duration employed can be seen by the fact that when the finished mold is cut apart, the ion exchanger grains fall out from the cut surface.

When making molded bodies with a thickness that exceeds 5–6 cm. it is useful to add 1–30% carbon to the mixture of thermoplastic material and ion exchange resin before sintering. Thereby a thorough sintering is achieved without having a melted film form on the surface of the molded body.

The permeability or porosity for liquids of molded bodies made in this manner is very good, but it can be increased still further by adding filler materials which are removed after sintering. Suitable filler materials are salts which are subsequently washed out, or organic substances which are still solid at the sintering temperature and which are subsequently removed by solvents.

However, fiber materials which are molded with a binding agent can also be used to advantage as framework substances.

The mixture of ion exchanger and fiber material must be wet with a liquid which is unmixable with the binding agent so that the binding agent can no longer soak the fibers throughout, but can only glue the surfaces of the fiber strands to each other. The ion exchanger imbedded in the fiber material—by swelling due to the liquid which is unmixable with the binding agent—loses its ability to cling to the binding agent, so that the entire surface of the ion exchanger is kept exposed.

As fiber material one can use any textile fabric, thread, fleece or even loose fibers which are inert under the conditions of use. For reasons of mechanical stability of the body to be molded and of transporting the material to and from the ion exchanger, fiber bundles have proven very useful.

The fibers may be either inorganic or organic. As inorganic fibers there may be mentioned for instance glass fibers, rock wool, slag wool, asbestos. As organic fibers one may use any fiber that is inert under the reaction conditions, e.g., cellulose and its derivatives, wool, polyvinyl-, polyamide-, polyester-, polyurethane-, polyethylene-, polypropylene- and polyacril-fibers, or fibers of polymerized halogenated ethylenes. It is useful to use a fiber material whose individual fibers have a smaller diameter than the ion exchanger particles so that the latter cannot fall out from the fiber material.

Generally useful as binding agents are high molecular substances which can achieve cohesion of the fiber material mixed with the ion exchanger. The choice depends on the desired application, it being of particular importance that the binding agent should be inert and insoluble in the reaction medium, and that it should not adversely affect the fibers of the mold.

For instance, the binding agent may be a resin or a plastic which is mixed and hardened in liquid form with the moistened mixture of ion exchanger and fibers. The manner of hardening depends on the binding agent used. For instance, if the binding agent is used as a melt, the hardening, for example of thermoplastic materials, is achieved by lowering the temperature; and of plastics that can be hardened—by hardening same either with a hardener or by the application of heat.

If the binding agent is a liquid or an emulsion, hardening can be achieved by evaporation of the solvent, as for instance in solutions of polyethylene, polyacrylic acid compounds, polyacrylic acid nitrile,, polystyrol, polyvinyl chloride, polyvinylidene chloride, polyvinyl acetate, polyvinyl alcohol, polyamides, cellulose derivatives, and solutions of artificial resins.

The solvent for the binding agent need not necessarily be insoluble in the liquid which was used for wetting the ion exchanger-fiber mixture. It is sufficient if only the binding agent itself is insoluble in this liquid. If the solvent for the binding agent is mixable with the liquid used for wetting, an additional hardening effect can be achieved by this. In such case the liquid used for wetting withdraws the solvent from the binding agent solution, and thus the binding agent is precipitated out. For instance, if the ion exchanger-fiber mixture is wet with water, the acetone or methanol in a solution with the binding agent can be absorbed by the water, whereby the binding agent is precipitated. Another possibility is to use liquid monomers or pre-polymerized products which are subsequently hardened by polymerization, polycondensation, poly-addition or cross-linkage. Here are a few examples: epoxide resins, acrylic acid esters, polyurethanes, polyesters, polyamides, aminoplasts, silicone resins.

In the molded bodies according to the process of the present invention the ion exchanger is retained without agglutination and while preserving its entire original surface. Surprisingly, the effectiveness of an ion exchanger arranged in this manner is not only higher in catalytic reactions than that of the agglutinated ion exchangers, but even higher than that of a pure exchanger enclosed, as has been done heretofore, in stacks or cages. Thanks to the simple production method of the molded bodies and the high efficiency of the ion exchanger as per the process of our invention, reactions can now be carried out in the presence of ion exchangers at little cost and without any complicated column installations to retain the fine-grained ion exchanger.

The shape of the molded body is determined by the reaction vessel. For instance, cylindrical bodies are suitable as fillers or charges for columns, likewise balls and thick-walled rings. However, the column can also be equipped with plate-shaped bodies for column floors which have better gas permeability. In that case the condensate can seep off downwardly through the plates. Although columns are generally preferred for reaction chambers, any other vessel suitable for a specific reaction can generally be used, the molded bodies being arranged accordingly. At any rate, the shape of the porous molded bodies can be varied at will.

The molded bodies made in accordance with the present invention can be used for all reactions that can be catalyzed by cation or anion exchangers, e.g. for acetalizing, hydrogen and hydrogen halide separations, additive reactions, hydrolyses, esterifications and re-esterifications, condensations, epoxydations, rearrangements and polymerizations. The molded bodies can be applied to particular advantage in reactions where a reaction product is to be in vapor form when removed from the ion exchanger bed at the rate at which said product is created. It is useful to proceed in such a manner that when carrying out the reaction, for instance in a column, the starting mixture is introduced into the upper part of said column and runs downward in the ion exchanger bed, while the reaction product is withdrawn at the head of the column.

The following examples will illustrate the process of the invention.

Example 1

Homogeneous mixtures of a thermoplastic material, an ion exchanger and if necessary a filler material were filled into cylindrical forms and heated until the plastic material sintered into an interconnected plastic framework or reticulum. At a certain temperature the sintering period was selected in such a way that the plastic material did not melt into an impervious film or membrane cemented to the ion exchanger. The diameter of the molded bodies used as column fillers was 1–5 cm. depending on the size of the column. Maintaining the conditions shown in the following table, the molded bodies listed therein were made. In the column which lists the name and weight parts of the exchanger employed, "(a)" represents anion exchanger, while "(c)" represents cation exchanger. In the column listing sintering periods the symbol "(*)" means lightly pressed before sintering:

The cooled molded bodies, after the filler material was removed, were activated by treating with 1% hydrochloric acid (for cation exchangers) or 1% sodium hydroxide (for anion exchangers) and subsequently washed free of acid or lye. The molds obtained in this manner are ready for use, after drying, if required

Example 2

A jacket-heated column 3 m. high. with an inside diameter of 50 mm. is filled with 6 liters of cylindrical molds with a diameter of about 10 mm. and containing cation exchangers (No. 12 of the table in Example 1). The molded bodies ready for use contain 120 g. of cation exchanger per liter, and the entire column filling is therefore 720 g.

Above the catalyst bed 960 g. of a methanol-formalin mixture, consisting of 47.5% methanol, 22.3% formaldehyde and 30.2% water, is fed into the column per hour. The jacket and the sump of the column are heated in such a way that the developing methylal is distilled off through a fractionating head. The sump of the column is pumped back to the head of the column at a speed of 300 g./h., while the remainder of the sump runs off continuously. One obtains each hour 518 g. of distillate with 98.2% methylal, 1.0% methanol and 0.8% water, as well as 426 g. of a sump free of formaldehyde and methanol. The yield of methylal in proportion to formaldehyde amounts to 93%.

If the column is filled with 3600 g. cation exchanger "Amberlite IR 120" which is spread on sieve floors, and the same conditions are maintained, no greater throughput is obtainable.

If the molds are supplied, instead of with "Amberlite IR 120," with exchangers on the base of styrol-, phenol-, acrylic acid- and vinyl resins with sulfonic acid and/or carboxyl groups known under the trade names "Lewatit," "Wofatit" and "Dowex," the same results are obtained as with "Amberlite IR 120."

Example 3

Using the same apparatus and the same catalyst as in Example 2, but without sump return, 1320 g. of an acetic acid-isopropenyl acetate mixture consisting of 68.2% isopropenyl acetate and 31.8% acetic acid are introduced per hour above the column filling. The jacket and the sump of the column are heated in such a manner that the developing acetone is distilled off continuously at the head of the column. The yield is 410 g. of 98% acetone per hour as a distillate, which corresponds to a transformation of 98.9%. The created acetic acid anhydride is withdrawn continuously from the sump of the column together with the excess isopropenyl acetate.

| | Thermoplastic Material | | Exchanger | | Filler | | Mold Size, cm. | Sintering | | Condition |
|---|---|---|---|---|---|---|---|---|---|---|
| No. | Name | Wt. Pts. | Name | Wt. Pts. | Name | Wt. Pts. | | Period, min. | Temp., °C. | |
| 1 | Polyethylene | 1 | "Amberlite IR 120 (c)" | 1 | NaCl | 1 | 4 | 90 | 170 | Firm, stable cylinders. |
| 2 | do | 1 | do | 1 | Na$_2$CO$_3$ | 1 | 5 | 130 | 160 | Do. |
| 3 | PVC p 60 sf | 1 | do | 1 | NaCl | 1 | 4 | 120 | 210 | Very hard, firm cylinders. |
| 4 | PVC H 100/70 F | 1 | do | 1 | NaCl | 1 | 3 | 90 | 210 | Do. |
| 5 | Polypropylene | 1 | do | 1 | | | 5 | 120 | 200 | Do. |
| 6 | Polyethylene | 1 | "Dowex 50 (c)" | 2 | | | 5 | *135 | 160 | Hard, firm cylinders. |
| 7 | do | 1 | "Duolite A 40 (a)" | 3 | | | 4 | *110 | 160 | Firm cylinders. |
| 8 | do | 1 | "Merck III (a)" | 1 | | | 4 | 150 | 150 | Hard, firm cylinders. |
| 9 | do | 1 | "Permutit ES (a)" | 1 | | | 4 | *165 | 150 | Very hard, firm cylinders. |
| 10 | do | 3 | "Ionac C-240 (c)" | 1 | | | 4 | *105 | 160 | Do. |
| 11 | do | 4 | "Permutit RS (c)" | 1 | | | 3 | *105 | 160 | Do. |
| 12 | do | 1 | "Amberlite IR 120 (c)" | 1 | NaCl | 1 | 1 | 30 | 170 | Stable cylinders. |
| 13 | do | 1 | do | 1 | | | 1 | 45 | 170 | Do. |
| 14 | Polystyrol | 1 | "Dowex 50 (c)" | 1 | | | 4 | | | |
| 15 | do | 2 | do | 1 | | | 4 | | | |
| 16 | Polyethylene | 2 | "Amberlite IR 4 B (a)" | 1 | | | 3 | 105 | 160 | Hard, firm cylinders. |

Example 4

Example 3 is repeated with a column filling obtained by sintering a mixture of 1.2 weight parts polyvinyl chloride, 0.8 weight part "Dowex 50" (highly acid cation exchanger on polystyrol base) and 1 weight part sodium chloride, and subsequent salt-free washing and transfer into the H-form. As in Example 3, the transformation is 98.9%.

Example 5

A column as in Example 2, whose column filling contains polypropylene instead of polyethylene, and which was made in the same manner as in Example 1, but at a sintering temperature of 210° C., is equipped above the discharge portion with a reflux condenser and underneath with an overflow flask. Above the filler bodies containing ion exchanger every hour 1002 g. of a diketen-ethanol mixture is introduced, consisting of 58.7% diketen and 41.3% ethanol. The jacket and the sump of the column are heated in such a manner that a return flow is maintained. The continuously discharged sump product is free of diketen, so that the transformation of the diketen is 100%. The created ethyl acetoacetate is obtained pure with some β-ethoxycrotonic acid ethyl ester from the sump runoff by fractional distillation.

Example 6

In the apparatus of Example 5 the cation exchanger "Amberlite IR 120" of the polypropylene filler body is replaced by the anion exchanger "Duolite A 40" and the experiment of Example 5 with diketen and ethanol is repeated. Here too, using the same introduced quantities, a 100% diketen transformation is obtained. Processing is effected by distillation, as in Example 5.

With the same result one can use, instead of "Duolite A 40," the anion exchangers "Lewatit MN," "Merck III," "Permutit ES" and "Permutit E."

Example 7

In a column 3 m. long and having a diameter of 6 cm., 70 porous floors 2 cm. thick made of polyethylene are placed, which contain the cation exchanger "Amberlite IR 120" and are equipped with gas passage apertures. The floors are made as in Example 1 by sintering a mixture of equal parts by weight of polyethylene powder, cation exchanger "Amberlite IR 120" and sodium chloride with subsequent removal of the salt by washing, activating with hydrochloric acid, and neutral washing. The gas passage apertures are punched out. The column has an exit portion 1 m. long, a magnetic distillate separator, and is equipped with a flask with overflow.

Above the floors every hour there are introduced 1050 g. acetic acid and 915 g. methanol. The column is heated in such a manner that the methyl acetate, at the rate of its formation, is distilled off as an azeotropic mixture with methanol, and the sump runoff is free of acid.

The hourly yield is 1700 g. distillate with 76.2% methyl acetate, 20.3% methanol and 3.5% water, as well as 256 g. water as sump runoff. The water is free of acetic acid, methanol and methyl acetate. The transformation is 100%.

Example 8

Into the apparatus of Example 7 one admits every hour above the exchanger floors 3508 g. of a methanol-formalin mixture with 47.9% methanol and 21.4% formaldehyde (the remainder is water). The heating is regulated in such a way that the created methylal is distilled off at the head of the column and the sump is free of methanol. The hourly yield is 1978 g. distillate with 91.6% methylal, 7.6% methanol and 0.8% water, as well as 1547 g. of sump runoff free of methanol, still containing some formaldehyde. The yield of methylal, related to the formaldehyde used, is 95%.

Example 9

In the apparatus as in Example 7, but with floors of polypropylene as the framework substance, every hour 1182 g. of β-methoxypropionic acid methyl ester are reesterified with 800 g. butanol. The created methanol is continuously distilled off at the head of the column, while the β-methoxypropionic acid butyl ester with excess butanol runs off continuously from the flask. The hourly yield is 318 g. distillate with 98.5% methanol. This corresponds to a transformation of 98%.

Example 10

A column 1 m. high and with a diameter of 3 cm. is filled with cylinders 1 cm. long which were obtained by sintering of equal parts by weight of polyethylene and of an anion exchanger "Amberlite IR A 400" at 160° C. Through the column acetone is boiled under reflux until the flask temperature has risen from the initial 56° C. to 111° C.

The created diacetone alcohol is freed of non-transformed acetone by distillation and obtained pure by vacuum distillation.

The same result is achieved when instead of the exchanger "Amberlite IR A 400," one uses the anion exchangers "Lewatit MN," "Merck III," "Permutit ES" or "Permutit E."

Example 11

A mixture of 10 parts by weight cation exchanger "Amberlite IR 120" and 20 parts by weight asbestos fibers is moistened with water, mixed with 10 parts by weight of an acetone solution of silicon resin "HK 15a" with a resin percentage of 25% and shaped into balls with diameters of 1–3 cm. By letting them stand for 1 day in the drying chamber at 100° C. the silicon resin is cross-linked and the acetone evaporates from the resin and the water from the fibers.

Example 12

The molded bodies made in Example 11, in order to transform the ion exchanger into H-form, are treated with diluted hydrochloric acid and then washed neutral with water. A jacket-heated column 3 m. high with an inside diameter of 50 mm. is filled with 6 liters of the molded bodies with diameter of 10 mm. as made in Example 11. The ready-to-use molds contain 120 g. cation exchanger per liter, thus the total column filling is 720 g. Above the catalyst bed there are introduced into the column every hour 960 g. of a methanol-formalin mixture, consisting of 47.5% methanol, 22.3% formaldehyde and 30.2% water. The jacket and the sump of the column are heated in such a way that the created methylal is distilled off through a fractionating head. The sump of the column is pumped back to the head of the column at a speed of 300 g./h., the rest of the sump running off continuously. The hourly yield is 518 g. distillate with 98.2% methylal, 1.0% methanol and 0.8% water, as well as 426 g. of a sump free from formaldehyde and methanol. The methylal yield is 93% related to formaldehyde. After a 3000 hour test period the mold bodies were unchanged.

If the column is filled with 3600 g. cation exchanger "Amberlite IR 120" spread out on sieve floors, and maintaining the same conditions, no higher throughput is possible.

Instead of the molded bodies made as per Example 11 one can use, with the same success, the molds enumerated in the following table, where the quantity of the mold material used corresponds with the quantity of cation exchanger of 720 g. The quantities of fiber material and ion exchanger shown are wet with the liquid (water) which does not mix with the binding agent and, while the binding agent is being added, formed into balls with diameters of 2–5 cm. The molds are then solidified in the manner shown in the table:

| No. | Binding Agent | | Fiber Material | | Ion Exchanger | | Solidification at— | |
|---|---|---|---|---|---|---|---|---|
| | Name | ccm. | Name | Grams | Name | Grams | °C. | Hard. period, hours |
| 1 | Silicon resin "HK 15a" | 18 | Glass wool | 10 | "Amberlite JR 120" | 10 | 100 | 15 |
| 2 | ____do | 10 | Asbestos wool | 10 | "Lewatit S 100" | 10 | 50 | 45 |
| 3 | Polystyrol (45% sol. in xylol) | 20 | Glass wool | 10 | "Amberlite JR 120" | 5 | 100 | 15 |
| 4 | ____do | 20 | ____do | 10 | "Dowex 50" | 10 | 100 | 15 |
| 5 | Ethoxylene resin ("Araldite" binding agent 102 plus hardener 936, mixing proportion 10.1, of the firm Ciba). | 10 | Rock wool | 10 | "Permutit RS" | 10 | 100 | 15 |
| 6 | ____do | 15 | Polyamide | 10 | ____do | 10 | 70 | 25 |
| 7 | ____do | 15 | P-V alcohol | 10 | ____do | 10 | 70 | 25 |
| 8 | ____do | 3 | Polyacryl nitril | 0.7 | ____do | 0.7 | 50 | 35 |
| 9 | ____do | 15 | Polyester | 10 | ____do | 10 | 100 | 15 |
| 10 | Ethoxylene resin ("Araldite" laminating resin 556 plus hardener 951, mix. proportion 10:1, of the firm Ciba). | 15 | Rock wool | 10 | "Amberlite JR 120" | 10 | 100 | 15 |
| 11 | ____do | 15 | Glass wool | 10 | ____do | 10 | 100 | 15 |
| 12 | ____do | 20 | Polyamide | 10 | ____do | 10 | 100 | 15 |
| 13 | Polyacrylic ester ("Acrifix 95" of the firm Rohm & Haas). | 30 | Glass wool | 10 | ____do | 10 | 80 | 25 |
| 14 | ____do | 35 | Polyamide | 10 | ____do | 10 | 80 | 25 |
| 15 | Polyurethane ("Desmodur L" plus "Desmocoll 12" of the firm Bayer Leverk). | 10 | Rock wool | 10 | ____do | 10 | 100 | 15 |
| 16 | ____do | 20 | Glass wool | 10 | ____do | 10 | 100 | 15 |
| 17 | ____do | 20 | Polyamide | 10 | ____do | 10 | 100 | 15 |
| 18 | ____do | 20 | P-V alcohol | 10 | ____do | 10 | 100 | 15 |
| 19 | Polyamide ("Versamide 930") | 20 | Rock wool | 10 | ____do | 10 | 100 | 15 |
| 20 | ____do | 35 | Glass wool | 10 | ____do | 10 | 100 | 15 |
| 21 | Ethoxylene resin ("Araldite" binding agent 102 plus hardener 936, mix. proportion 10:1). | 30 | Polyamide | 10 | ____do | 1 | 100 | 20 |
| 22 | ____do | 35 | ____do | 10 | ____do | 100 | 100 | 20 |

Example 13

Using the same apparatus and the same catalyst as in Example 12, but without sump circulation, there are introduced above the column filling each hour 1320 g. of an acetic acid-isopropenyl acetate mixture, consisting of 68.2% isopropenyl acetate and 31.8% acetic acid. The jacket and the sump of the column are heated in such a manner that the created acetone is continuously distilled off at the head of the column. The hourly yield is 410 g. of 98% acetone as distillate which corresponds to a transformation of 98.9%. The created acetic acid anhydride is withdrawn continuously from the sump of the column together with the excess isopropenyl acetate. The molded bodies remained unchanged after a 2500 hour test period.

Example 14

In the same manner as the molds made according to the table in Example 12, the following molds can be made:

| No. | Binding Agent | | Fiber Material | | Ion Exchanger | | Solidification at | | Wetting Agent |
|---|---|---|---|---|---|---|---|---|---|
| | Name | ccm. | Name | Grams | Name | Grams | °C. | Hard. period, hrs. | |
| 23 | Polyvinyl alcohol (10% aqueous sol.) | 30 | Glass wool | 10 | Amberlite JR 120 | 10 | 100 | 20 | Benzene. |
| 24 | "Wacker W 48/20" | 30 | ____do | 10 | ____do | 10 | 100 | 20 | 2.3-dimethyl butane |
| 25 | ____do | 30 | ____do | 10 | ____do | 10 | 100 | 20 | dibutyl ether. |
| 26 | ____do | 30 | ____do | 10 | ____do | 10 | 100 | 20 | Trichlorethylene. |

Example 15

A mixture of 10 parts by weight of the anion exchanger "Amberlite JRA 400" and 10 parts by weight polyamide fibers is wet with water, mixed with 20 parts by weight of a mixture of "Araldite" laminating resin 556 and the hardener No. 951 (mixing proportion 10:1) and shaped into balls with diameters of 1-3 cm. After letting these stand for 15 hours in the drying chamber at 100° C. the ethoxylene resin interlaces and the water evaporates from the fibers.

In order to transform the ion exchanger into the hydroxyl form, the molded bodies are treated with 2n—NaOH and subsequently washed neutral with distilled water.

Through a column 150 cm. high and with a diameter of 8 cm. filled with these molded bodies, acetone is boiled under reflux until the flask temperature has risen from the initial 56° C. to 111° C. The created diacetone alcohol is separated from the starting material by distillation and purified by vacuum distillation.

If the molded bodies are formed, instead of with "Amberlite JRA 400," with "Lewatit MN," "Merck III," "Permutit ES" or "Permutit E," the same result is obtained.

Example 16

A column as described in Example 12, filled with molded bodies No. 16 in the table, is equipped above the discharge portion with a reflux cooler, and underneath with an overflow flask. Above the ion exchanger-containing filler bodies there are introduced every hour 1002 g. of a diketen-ethanol mixture, consisting of 58.7% diketen and 41.3% ethanol. The jacket and the sump of the column are heated in such a way that recirculation is maintained. The continuously discharged sump product is free of diketen, thus the transformation of diketen is 100%. The created ethyl-aceto-acetate is obtained pure together with some β-ethoxy-crotonic acid ethyl ester, from the sump runoff, by fractional distillation.

Example 17

In the apparatus of Example 16 the cation exchanger of the molds is replaced by the anion exchanger "Duolite A 40" and the experiment of Example 16 is repeated with diketen and ethanol. Here too, maintaining the same introduced quantities, the result is a 100% transformation of diketen. The processing is done as described in Example 16, by distillation. Instead of "Duolite A 40" one can use with the same results the anion exchanger "Lewatit MN," "Merck III," "Permutit ES" or "Permutit E."

*Example 18*

70 floors, each 2 cm. thick, containing the cation exchanger "Amberlite JR 120" and each equipped with an aperture for the passage of gas, are placed inside a column 3 m. high having a diameter of 6 cm. The composition of the floors is the same as that of the balls made in the table of Example 12 under items Nos. 10 and 11. The column has a discharge portion which is 1 m. high, a magnetic distillate separator and is equipped with a flask with overflow.

Above the floors each hour 1050 g. acetic acid and 915 g. methanol is admitted. The flask is heated in such a manner that the methyl acetate is distilled off at the rate at which it is created, as an azetrope with methanol, and the sump runoff is free of acid.

The hourly yield is 1700 g. distillate with 76.2% methyl acetate, 20.3% methanol and 3.5% water, as well as 256 g. water as sump runoff. The water is free of acetic acid, methanol and methyl acetate. The transformation is 100%.

*Example 19*

A mixture of equal parts polyethylene powder commercially available under the trade name "Hostalen GUR" and the commercially available ion exchanger "Amberlite IR 120," is filled into paper forms of about 8 cm. diameter and sintered at 160° C. in a drying chamber. Previous to that, 2, 10, 20 and 30% activated carbon, related to the entire mixture, is admixed in some of the forms. After 10 hours the mold bodies containing carbon are sintered through perfectly and have a porous non-melted surface.

The mold bodies without carbon have melted to about one-half of their original volume and have a smooth pore-free surface. If the carbon-free mold bodies are taken out of the drying chamber before a melted skin shows, a considerable part of the core is not sintered through and is powdery.

The invention claimed is:

1. Process for manufacturing coarse grain molded porous bodies containing ion exchangers, which comprises forming a mixture of a thermoplastic material and particles of ion exchanger material, said mixture having weight proportions of thermoplastic material to particles of ion exchange material in an amount sufficient to permit swelling and prevent breakage of the ion exchange material, forming said mixture into molded forms, heating said molded forms to sintering temperature, and interrupting the heating before said thermoplastic material can stick to said ion exchanger material by melting.

2. Process according to claim 1, in which the initial mixture includes particles of a filler material which is soluble in a given solvent, and in which, after said molded bodies are completely formed, they are treated with said solvent to remove said filler material.

3. Process according to claim 1, characterized by the fact that the initial mixture consists of particles of thermoplastic material which are smaller than the particles of ion exchanger material in said mixture.

4. Process according to claim 3, in which 1–30% by weight of carbon, related to the entire mixture, is admixed with the thermoplastic material and ion exchanger material before sintering.

5. Process for manufacturing coarse grain molded porous bodies containing ion exchangers, which comprises forming a mixture of fibrous material and particles of ion exchanger material, said mixture having weight proportions of fibrous material to particles of ion exchange material in an amount sufficient to permit swelling and prevent breakage of the ion exchange material, wetting said mixture with a liquid, mixing said wet mixture with a binding agent which is insoluble in said liquid whereby said binding agent cannot soak inside the wet fibers, and removing said liquid from said last-mentioned mixture to cause said binding agent to stick the surfaces of said fibers together.

6. A product produced by the process as defined in claim 5.

7. A product produced by the process as defined in claim 1.

References Cited by the Examiner

UNITED STATES PATENTS 3,024,207  3/1962  Shaw et al. _____ 260—2.1

FOREIGN PATENTS 877,744  5/1953  Germany.
1,121,326  1/1962  Germany.

TOBIAS E. LEVOW, *Primary Examiner.*

SAMUEL H. BLECH, *Examiner.*